US012738701B2

United States Patent
(12) United States Patent
Li et al.

(10) Patent No.: US 12,738,701 B2
(45) Date of Patent: Sep. 15, 2026

(54) ENERGY STORAGE CONNECTOR

(71) Applicant: CONTEMPORARY AMPEREX TECHNOLOGY (HONG KONG) LIMITED, Hong Kong (CN)

(72) Inventors: Boyang Li, Ningde (CN); Qifeng Chen, Ningde (CN); Xu Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 530 days.

(21) Appl. No.: 18/361,874

(22) Filed: Jul. 30, 2023

(65) Prior Publication Data

US 2023/0369818 A1 Nov. 16, 2023

Related U.S. Application Data

(63) Continuation of application No. PCT/CN2022/096909, filed on Jun. 2, 2022.

(30) Foreign Application Priority Data

Oct. 29, 2021 (CN) ......................... 202122635800.9

(51) Int. Cl.
*H01R 27/02* (2006.01)
*H01M 10/42* (2006.01)
(Continued)

(52) U.S. Cl.
CPC .......... *H01R 27/02* (2013.01); *H01M 10/425* (2013.01); *H01M 50/583* (2021.01);
(Continued)

(58) Field of Classification Search
None
See application file for complete search history.

(56) References Cited

U.S. PATENT DOCUMENTS 9,640,920 B2 * 5/2017 Hanaoka ............ H01R 13/6683
10,511,121 B2 * 12/2019 Milroy ............... H01R 13/5221
(Continued)

FOREIGN PATENT DOCUMENTS

CN 2632864 Y 8/2004
CN 104836043 A * 8/2015 ............ H01R 12/75
(Continued)

OTHER PUBLICATIONS

State Intellectual Property Office of China Notice of Grant of Invention Patent Right for Application No. 202122635800.9, Feb. 16, 2022 2 pages (including translation).
(Continued)

*Primary Examiner* — Tho D Ta
(74) *Attorney, Agent, or Firm* — ANOVA LAW GROUP, PLLC

(57) ABSTRACT

An energy storage connector includes an integrated socket and a signal connector plug. The integrated socket includes a socket body and a rear-mounted insert mounted at the socket body and configured to be plugged with an energy storage device. The signal connector plug includes a signal plug body. One end of the signal plug body is detachably mounted at the socket body and plugged with the rear-mounted insert, and another end of the signal plug body is configured to be plugged with a signal cable.

19 Claims, 10 Drawing Sheets

(51) Int. Cl.

| | |
|---|---|
| ***H01M 50/583*** | (2021.01) |
| ***H01R 13/506*** | (2006.01) |
| ***H01R 13/70*** | (2006.01) |
| *H01R 13/73* | (2006.01) |

(52) U.S. Cl.
CPC ........... *H01R 13/506* (2013.01); *H01R 13/70* (2013.01); *H01M 2200/103* (2013.01); *H01R 13/73* (2013.01)

(56) References Cited

U.S. PATENT DOCUMENTS

| | | | | |
|---|---|---|---|---|
| 2011/0189888 | A1* | 8/2011 | Rhein | H01R 13/5202 439/572 |
| 2012/0108100 | A1 | 5/2012 | Hueppe et al. | |
| 2013/0288543 | A1 | 10/2013 | Higuchi et al. | |
| 2013/0288743 | A1 | 10/2013 | Hunt et al. | |
| 2021/0226390 | A1* | 7/2021 | Blakborn | H01R 13/512 |

FOREIGN PATENT DOCUMENTS

| | | | | | |
|---|---|---|---|---|---|
| CN | 105826145 | A | | 8/2016 | |
| CN | 206758543 | U | | 12/2017 | |
| CN | 208014788 | U | | 10/2018 | |
| CN | 208324866 | U | | 1/2019 | |
| CN | 208401122 | U | | 1/2019 | |
| CN | 209001012 | U | | 6/2019 | |
| CN | 110212142 | A | | 9/2019 | |
| CN | 210092202 | U | | 2/2020 | |
| CN | 210379227 | U | | 4/2020 | |
| CN | 216055282 | U | | 3/2022 | |
| CN | 216121059 | U | | 3/2022 | |
| GB | 2505645 | A | * | 3/2014 | H01R 13/64 |
| JP | H0917520 | A | | 1/1997 | |
| JP | 2001085109 | A | | 3/2001 | |
| JP | 2003168520 | A | | 6/2003 | |
| JP | 2010532542 | A | | 10/2010 | |
| JP | 2016519835 | A | | 7/2016 | |
| JP | 2017525101 | A | | 8/2017 | |
| JP | 2018026384 | A | | 2/2018 | |
| JP | 2018063727 | A | | 4/2018 | |
| JP | 2021047999 | A | | 3/2021 | |

OTHER PUBLICATIONS

The European Patent Office (EPO) The Extended European Search Report for Application No. 22747921.9, Dec. 18, 2023 6 Pages.
The Japan Patent Office (JPO) Notification of Reasons for Refusal for Application No. 2022-545445 Jan. 9, 2024 16 Pages (including translation).
The World Intellectual Property Organization (WIPO) International Search Report and Written Opinion for PCT/CN2022/096909 Aug. 8, 2022 21 pages (Translation included).
Korean Intellectual Property Office (KIPO) Patent office notice of opinion submission for 20227028042 Mar. 28, 2024 8 Pages (including translation).
Japan Patent Office (JPO) The Decision to Grant a Patent for JP Application No. 2022-545445 Jun. 25, 2024 6 Pages (Translation Included ).
Korean Intellectual Property Office (KIPO) The Written Decision on Registration for Application No. 9-5-2024-053515494 Jun. 26, 2024 5 Pages (Translation Included ).

* cited by examiner

ENERGY STORAGE CONNECTOR

CROSS-REFERENCE TO RELATED APPLICATIONS

The present application is a continuation of International Application No. PCT/CN2022/096909, filed on Jun. 2, 2022, which claims priority to Chinese patent application No. 202122635800.9 filed on Oct. 29, 2021 and entitled "Energy Storage Connector," the entire contents of both of which are incorporated herein by reference.

TECHNICAL FIELD

The present application relates to the technical field of batteries, and in particular, to an energy storage connector.

BACKGROUND ART

An energy storage device is often electrically connected to other devices through an energy storage connector, so that the energy storage device can supply power to other devices, or the energy storage device can be charged through other devices.

In the process of using the energy storage device to supply power to other devices or charging the energy storage device through other devices, a voltage signal and/or a temperature signal of the energy storage device cannot be collected in time, resulting in the inability to know the status of the energy storage device in time. As a result, the energy storage device is prone to damage.

SUMMARY

In view of the above problems, the present application provides an energy storage connector, which can collect a voltage signal and/or a temperature signal of an energy storage device in time when the energy storage device is in use, so as to know the status of the energy storage device in time, thereby avoiding the situation where the energy storage device is prone to damage.

The present application provides an energy storage connector, including: an integrated socket, the integrated socket including a socket body and a rear-mounted insert mounted at the socket body and used for plugging with an energy storage device; and a signal connector plug, the signal connector plug including a signal plug body, one end of the signal plug body being detachably mounted at the socket body and plugged with the rear-mounted insert, and the other end being used for plugging with a signal cable.

In the technical solution of an example of the present application, the integrated socket includes the socket body and the rear-mounted insert mounted at the socket body and used for plugging with the energy storage device; and the signal connector plug includes the signal plug body, one end of the signal plug body is detachably mounted at the socket body and plugged with the rear-mounted insert, and the other end is used for plugging with the signal cable. With such a design, after the rear-mounted insert and the energy storage device are plugged and the signal plug body and the signal cable are plugged, when the energy storage device is used, that is, in the process that the energy storage device is used to supply power to other devices through the energy storage connector, or other devices are used to charge the energy storage device through the energy storage connector, the signal cable may be used to collect a voltage signal and/or a temperature signal of the energy storage device through the signal plug body and the rear-mounted insert, so that the status of the energy storage device can be known in time, thereby avoiding the situation where the energy storage device is prone to damage. In addition, since one end of the signal plug body is detachably mounted at the socket body, when there is no need to collect the voltage signal and/or the temperature signal of the energy storage device, or when the signal plug body is damaged, the signal plug body can be detached from the socket body.

In some examples, the signal connector plug further includes a locking hook and a plug case, and the locking hook and the signal plug body are both fixed at the plug case; the socket body is provided with a protruding annular stopper, and an outer wall of the annular stopper is provided with a protruding locking block; and one end of the signal plug body is inserted into the annular stopper along a first direction, and the locking block and the locking hook are arranged in sequence along the first direction and abut against each other, so as to clamp one end of the signal plug body in the annular stopper. In this way, after one end of the signal plug body is inserted into the annular stopper along the first direction and the locking block and the locking hook are arranged in sequence along the first direction and abut against each other, it can be ensured that the signal plug body is stably fixed to the socket body. In addition, when the signal plug body and the socket body need to be separated, the locking hook may be retracted along a protruding direction of the locking block and separated from the locking block, so as to take out one end of the signal plug body from the annular stopper.

In some examples, the socket body is provided with a hanging slot; and one end of the rear-mounted insert is detachably mounted in the hanging slot and plugged with one end of the signal plug body, and the other end is used for plugging with the energy storage device. By mounting one end of the rear-mounted insert in the hanging slot, one end of the rear-mounted insert may be prevented from colliding with other components, thereby avoiding damage to one end of the rear-mounted insert.

In some examples, the rear-mounted insert is provided with a protruding hanging platform; an inner wall of the hanging slot is provided with a first stopper; and one end of the rear-mounted insert is inserted into the hanging slot along a concave direction of the hanging slot, and the first stopper and the hanging platform are arranged in sequence along the concave direction of the hanging slot and abut against each other, so as to clamp one end of the rear-mounted insert in the hanging slot, wherein the hanging platform may be retracted along an opposite direction of its protruding direction to be separated from the first stopper. In this way, after one end of the rear-mounted insert is inserted into the hanging slot along the concave direction of the hanging slot and the first stopper and the hanging platform are arranged in sequence along the concave direction of the hanging slot and abut against each other, it can be ensured that the rear-mounted insert is stably fixed in the hanging slot. In addition, when the rear-mounted insert and the socket body need to be separated, the hanging platform may be retracted along the opposite direction of its protruding direction and separated from the locking block, so that one end of the rear-mounted insert is taken out from the hanging slot.

In some examples, the energy storage connector further includes: a maintenance switch; the integrated socket further includes two first slot assemblies mounted at the socket body and used for electrical connection with a conductive loop of the energy storage device; and the maintenance switch includes a switch body, two maintenance inserting pieces, and a connection structure located between the two maintenance inserting pieces and electrically connected to the two maintenance inserting pieces, the switch body is detachably mounted at the socket body, the two maintenance inserting pieces and the connection structure are both fixed at the switch body, and the two maintenance inserting pieces are inserted in the two first slot assemblies, respectively. In this way, when the conductive loop of the energy storage device needs to be cut off, the maintenance switch may be separated from the socket body to cut off the electrical connection between the two first slot assemblies, thereby cutting off the conductive loop of the energy storage device.

In some examples, the maintenance switch further includes a maintenance handle fixed to the switch body, and two first sliding rails oppositely arranged at two sides of the maintenance handle; and the integrated socket further includes two oppositely arranged first rotating shafts fixed at the socket body, and the two first rotating shafts are slidably arranged at the two first sliding rails, respectively. In this way, by moving the maintenance handle to make the two first rotating shafts slide on the two first sliding rails, respectively, the maintenance inserting pieces are inserted into the first slot assemblies, or the maintenance inserting pieces are separated from the first slot assemblies.

In some examples, the integrated socket further includes socket buckle covers fixed to the first slot assemblies, and the socket buckle covers are provided with protruding buckle platforms; the socket body is provided with buckle grooves, and inner walls of the buckle grooves are provided with second stoppers; and at least a part of the first slot assemblies and the socket buckle covers are inserted into the buckle grooves along a concave direction of the buckle grooves, the second stoppers and the buckle platforms are arranged in sequence along the concave direction of the buckle grooves and abut against each other, so as to clamp at least a part of the first slot assemblies and the socket buckle covers in the buckle grooves. In this way, after at least a part of the first slot assemblies and the socket buckle covers are inserted into the buckle grooves along the concave direction of the buckle grooves and the second stoppers and the buckle platforms are arranged in sequence along the concave direction of the buckle grooves and abut against each other, it can be ensured that at least a part of the first slot assemblies and the socket buckle covers are stably fixed in the buckle grooves.

In some examples, the first slot assemblies include slot members and adapter inserting pieces, the slot members are plugged with the maintenance inserting pieces, one ends of the adapter inserting pieces are inserted into the slot members after passing through the socket buckle covers, and the other ends are used for electrical connection with the conductive loop of the energy storage device; the socket buckle covers are provided with position-limiting pieces; the slot members and the socket buckle covers are inserted into the buckle grooves along the concave direction of the buckle grooves, and the position-limiting pieces and the slot members are arranged in sequence along the concave direction of the buckle grooves and abut against each other, so as to clamp the slot members in the buckle grooves. In this way, after the slot members and the socket buckle covers are inserted into the buckle grooves along the concave direction of the buckle grooves and the position-limiting pieces and the slot members are arranged in sequence along the concave direction of the buckle grooves and abut against each other, it can be ensured that the slot members are stably fixed in the buckle grooves.

In some examples, the adapter inserting pieces include protruding position-limiting side teeth; the socket buckle covers are provided with protruding positioning spring teeth; the adapter inserting pieces are inserted into the socket buckle covers along a second direction, and the positioning spring teeth and the position-limiting side teeth are arranged in sequence along the second direction and abut against each other, wherein the positioning spring teeth may be retracted along an opposite direction of their protruding direction and separated from the position-limiting side teeth. In this way, the adapter inserting pieces are inserted into the socket buckle covers along the second direction and the positioning spring teeth and the position-limiting side teeth are arranged in sequence along the second direction and abut against each other, so that it can be ensured that the adapter inserting pieces are stably fixed at the socket buckle covers. In addition, when the adapter inserting pieces and the socket buckle covers need to be separated, the positioning spring teeth may be retracted along the opposite direction of their protruding direction and separated from the position-limiting side teeth, thereby separating the adapter inserting pieces from the socket buckle covers.

In some examples, each slot member includes two oppositely arranged walls and two elastic pieces located between the two walls, and the two elastic pieces protrude along a direction in which the two elastic pieces approach each other; and one end of the adapter inserting piece is inserted between the two elastic pieces and makes any elastic piece elastically deform under pressing of the wall fixed to the elastic piece and the adapter inserting piece. In this way, the stability of the slot members and the adapter inserting pieces after being inserted can be improved.

In some examples, the connection structure is a fuse. In this way, when a current flowing through the two maintenance inserting pieces exceeds a specified value of the fuse, the fuse may cut off the electrical connection of the two maintenance inserting pieces, thereby cutting off the conductive loop of the energy storage device.

In some examples, the energy storage connector further includes: two current connector plugs; the integrated socket further includes two second slot assemblies mounted at the socket body and used for being plugged with positive and negative electrodes of the energy storage device, respectively; the current connector plugs include current plug bodies; and one end of any one of the two current plug bodies is detachably mounted at the socket body and plugged with any one of the two second slot assemblies, and the other end is used for plugging with a cable. After the two second slot assemblies are plugged with the positive and negative electrodes of the energy storage device, respectively, and the two current plug bodies are both plugged with the cable, the energy storage device may supply power to other devices through the energy storage connector and the cable, or other devices may charge the energy storage device through the cable and the energy storage connector.

In some examples, each current connector plug further includes a plug handle fixed to the current plug body, and two second sliding rails oppositely arranged at two sides of the plug handle; and the integrated socket further includes two oppositely arranged second rotating shafts fixed at the socket body, and the two second rotating shafts are slidably arranged at the two second sliding rails respectively. In this way, by moving the plug handles to make the two second rotating shafts slide on the two second sliding rails respectively, the current plug bodies are inserted into the second slot assemblies, or the current plug bodies are separated from the second slot assemblies.

In some examples, the integrated socket further includes a flange sealing ring mounted at the socket body and used for abutting against the energy storage device, and the flange sealing ring surrounds the rear-mounted insert. In this way, after the integrated socket is connected to the energy storage device, the sealing performance of a junction between the integrated socket and the energy storage device can be improved. In addition, since the flange sealing ring surrounds the rear-mounted insert, after the integrated socket is connected to the energy storage device, the rear-mounted insert can be prevented from being easily damaged due to the exposure of the rear-mounted insert.

In some examples, the socket body is provided with an annular groove; and a part of the flange sealing ring is clamped in the annular groove, and the other part is used for abutting against the energy storage device. In this way, after a part of the flange sealing ring is clamped in the annular groove, the stability when the flange sealing ring and the socket body are fixed can be improved, and the relative movement of the socket body and the flange sealing ring can be avoided.

In some examples, the integrated socket further includes a plurality of insert nuts integrally formed with the socket body by injection molding and used for fixing the energy storage device. In this way, the integrated socket can be stably fixed at the energy storage device by being fixed to the energy storage device through the plurality of insert nuts.

In some examples, the socket body is provided with a first mounting surface and a second mounting surface opposite to the first mounting surface and used for being mounted to the energy storage device, and the rear-mounted insert is arranged at the second mounting surface; and the signal connector plug is mounted at the first mounting surface. In this way, when the rear-mounted insert and the signal connector plug are assembled on the socket body, the signal connector plug can be assembled on the first mounting surface, and the socket body can be assembled on the second mounting surface, so that mutual interference of the rear-mounted insert and the signal connector plug in the assembling process is avoided.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are descried as follows.

DESCRIPTION OF DRAWINGS

Various other advantages and benefits will become apparent to those of ordinary skill in the art upon reading the following detailed description of some embodiments. The drawings are for the purpose of illustrating some embodiments only and are not intended to limit the scope of the present application. Also, the same components are denoted by the same reference numerals throughout the drawings. In the drawings.

Figure 1:
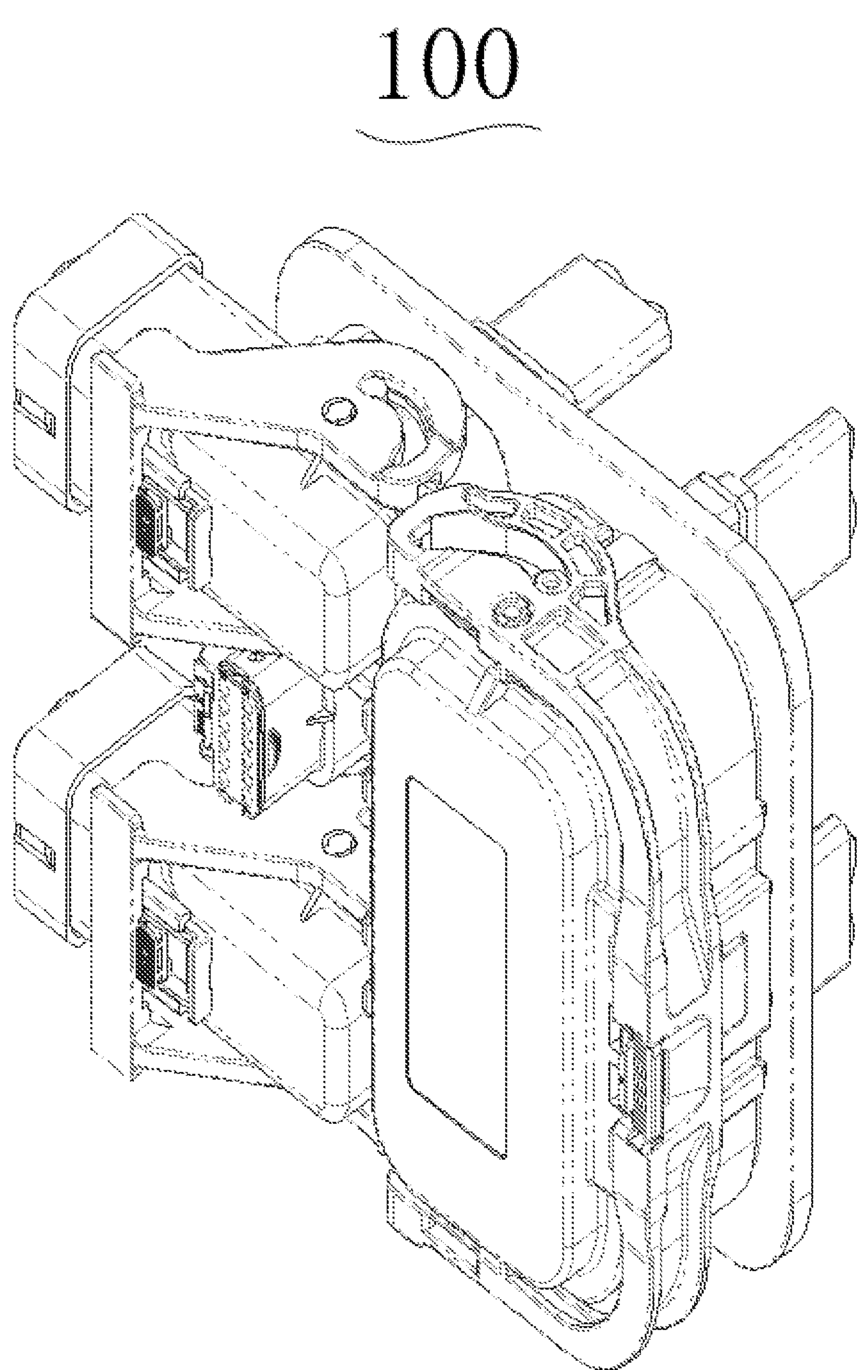
FIG. 1 is a schematic structural view of an energy storage connector according to some examples of the present application.
Figure 2:
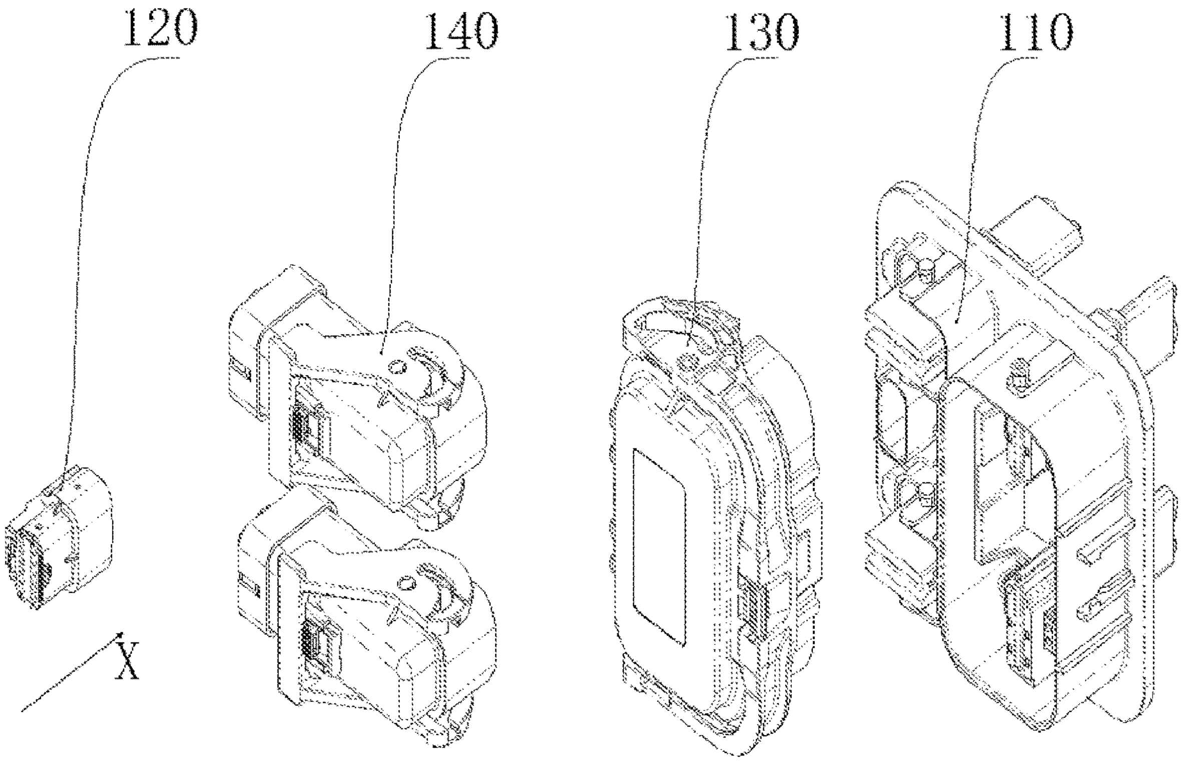
FIG. 2 is a schematic exploded view of an energy storage connector according to some examples of the present application.
Figure 3:
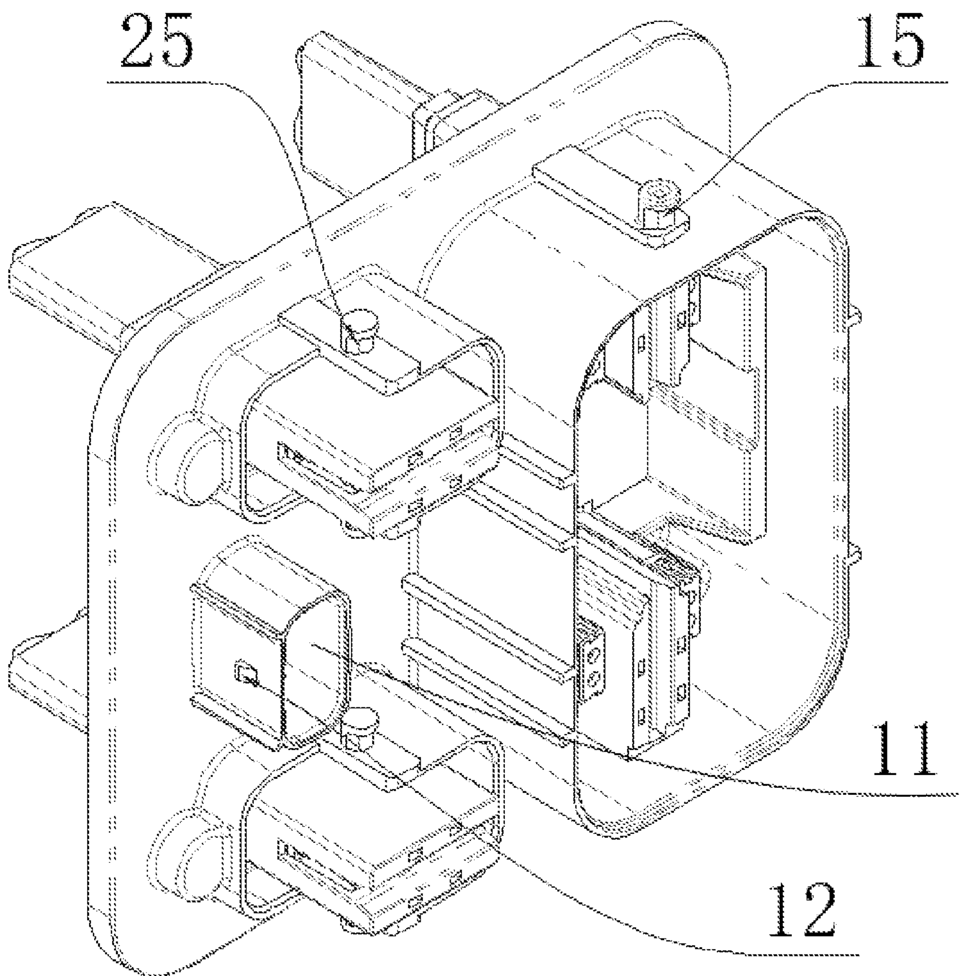
FIG. 3 is a schematic structural view of an integrated socket according to some examples of the present application.
Figure 4:
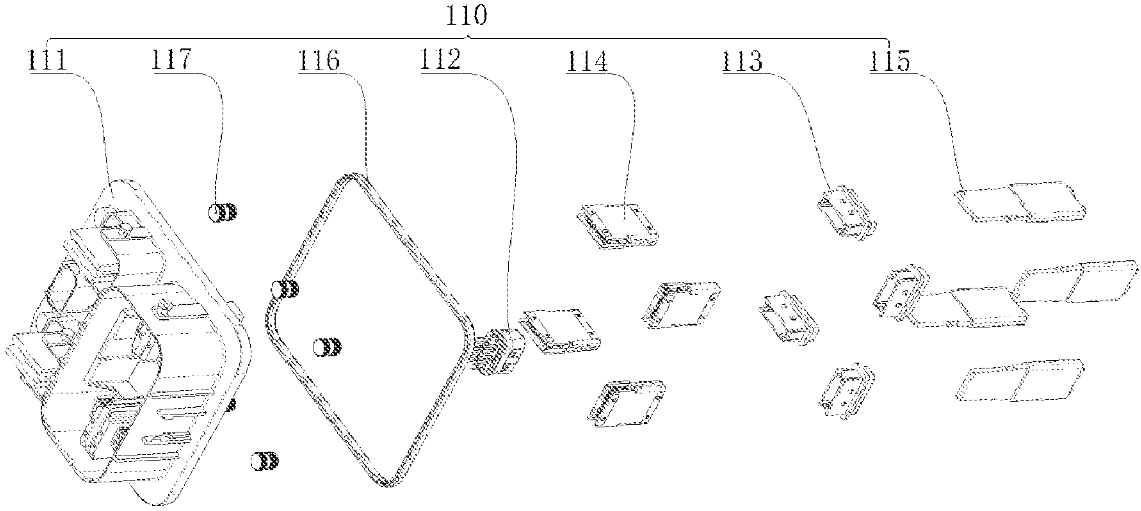
FIG. 4 is a schematic exploded view of an integrated socket according to some examples of the present application.
Figure 5:
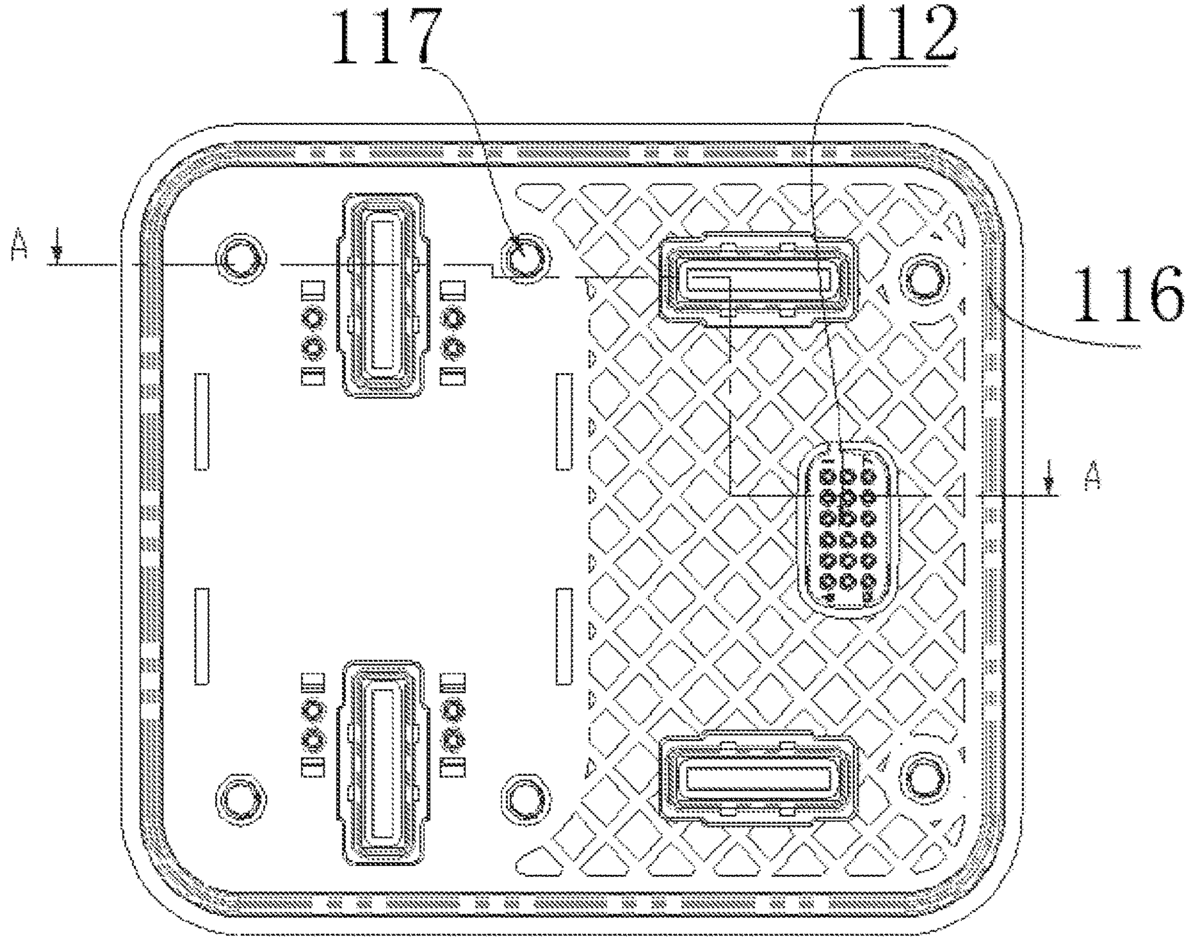
FIG. 5 is a schematic structural view from another view angle of an integrated socket according to some examples of the present application.
Figure 6:
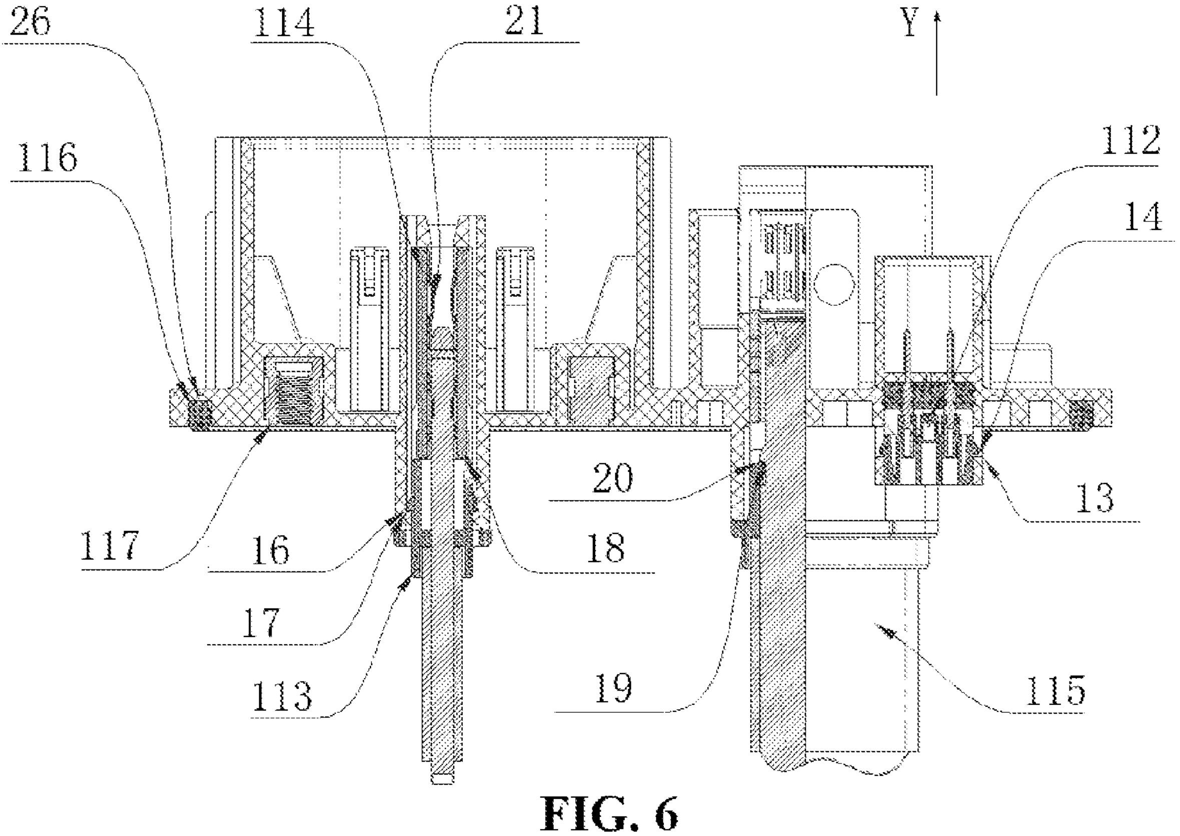
FIG. 6 is a cross-sectional view taken along a direction A-A of FIG. 5.
Figure 7:
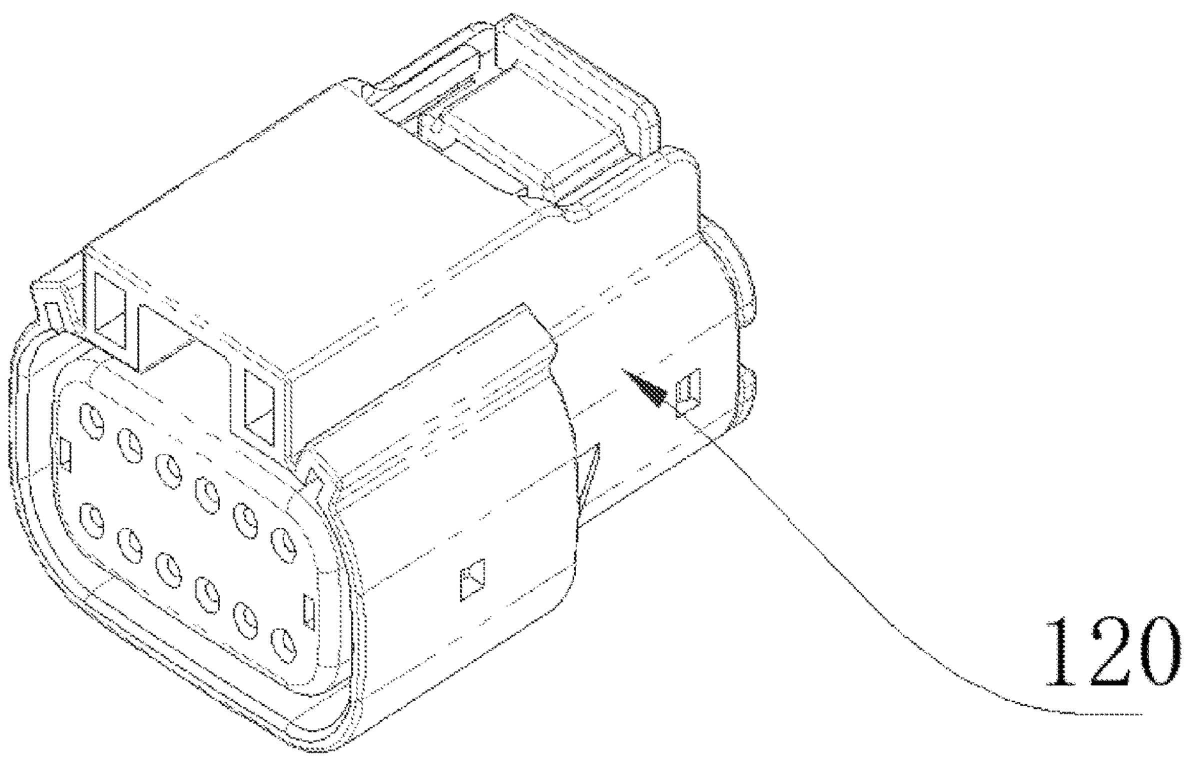
FIG. 7 is a schematic structural view of a signal connector plug according to some examples of the present application.

The drawings are not necessarily drawn to actual scale.

The reference numerals in the detailed description are as follows:

energy storage connector 100;

integrated socket 110, socket body 111, rear-mounted insert 112, socket buckle cover 113, slot member 114, adapter inserting piece 115, flange sealing ring 116, nut 117;

annular stopper 11, locking block 12, hanging slot 13, hanging platform 14, first rotating shaft 15, buckle platform 16, buckle groove 17, position-limiting piece 18, limiting side tooth 19, positioning spring tooth 20, elastic piece 21, second rotating shaft 25, annular groove 26;

signal connector plug 120, signal plug body 121, locking hook 122, plug case 123, first locking piece 124;

maintenance switch 130, switch body 131, maintenance inserting piece 132, connection structure 133, maintenance handle 134, first sliding rail 135, second locking piece 136;

current connector plug 140, current plug body 141, plug handle 142, second sliding rail 143, third locking piece 144.

DETAILED DESCRIPTION

Examples of the technical solutions of the present application will be described in detail below in conjunction with the accompanying drawings. The following examples are only used to illustrate the technical solutions of the present application more clearly, and are therefore only used as instances, and cannot be used to limit the scope of protection of the present application.

Unless otherwise defined, all technical and scientific terms used herein have the same meaning as commonly understood by those skilled in the art to which the present application belongs; the terms used herein are for the purpose of describing specific examples only, and are not intended to limit the present application; and the terms “including” and “having” and any variations thereof in the description and claims of the present application as well as in the above description of drawings are intended to cover a non-exclusive inclusion.

In the description of the examples of the present application, the technical terms "first," "second," and the like are only used to distinguish between different objects, and are not to be understood as indicating or implying a relative importance or implicitly specifying a number, a particular order, or a primary and secondary relation of the technical features indicated.

Reference herein to "an example" means that a particular feature, structure, or characteristic described in connection with the example can be included in at least one example of the present application. The appearance of this phrase in various places in the specification does not necessarily refer to the same example, nor is it a separate or alternative example that is mutually exclusive with other examples. It is explicitly and implicitly understood by those skilled in the art that the examples described herein may be combined with other examples.

In the description of the examples of the present application, the term "and/or" is only an association relationship for describing associated objects, indicating that three relationships may exist. For example, A and/or B indicates that there are three cases of A alone, A and B together, and B alone. In addition, the character "/" herein generally means that associated objects before and after it are in an "or" relationship.

In the description of the examples of the present application, the term "plurality of" refers to two or more (including two), and similarly, "multiple groups" refers to two or more (including two) groups, and "multiple sheets" refers to two or more (including two) sheets.

In the description of the examples of the present application, the orientation or positional relationships indicated by the technical terms "central," "longitudinal," "transverse," "length," "width," "thickness," "upper," "lower," "front," "rear," "left," "right," "vertical," "horizontal," "top," "bottom," "inner," "outer," "clockwise," "anticlockwise," "axial," "radial," "circumferential," etc. are based on the orientation or positional relationships shown in the accompanying drawings and are only for facilitating the description of the examples of the present application and simplifying the description, rather than indicating or implying that the apparatus or element referred to must have a particular orientation or be constructed and operated in a particular orientation, and therefore will not be interpreted as limiting the examples of the present application.

In the description of the examples of the present application, unless otherwise expressly specified and defined, the technical terms "mounted," "linked," "connected," "fixed," and the like are to be understood broadly, and may, for example, be fixedly connected or detachably connected, or integrated; and may also be mechanically connected or electrically connected; and may be directly linked or indirectly linked through an intermediate medium, and may be internal communication or interaction between two elements. For those of ordinary skill in the art, the specific meanings of the above terms in the examples of the present application can be understood on a case-by-case basis.

With the development of science, new energy technologies are also developing, especially an energy storage technology. An energy storage device is often electrically connected to other devices through an energy storage connector, so that the energy storage device can supply power to other devices, or the energy storage device can be charged through other devices.

The inventor noticed that, in the process of using the energy storage device to supply power to other devices or charging the energy storage device through other devices, a voltage signal and/or a temperature signal of the energy storage device cannot be collected in time, resulting in the inability to know the status of the energy storage device in time. As a result, the energy storage device is prone to damage.

In order to collect a voltage signal and/or a temperature signal of the energy storage device in time when the energy storage device is in use, the inventor has found through research that an integrated socket of the energy storage connector may be provided with a rear-mounted insert plugged with the energy storage device, and a signal connector plugged with the rear-mounted insert and used for plugging with a signal cable, so that when the energy storage device is in use, the voltage signal and/or the temperature signal of the energy storage device are/is collected in time through the signal cable, the signal connector and the rear-mounted insert, and the status of the energy storage device can be known in time, thereby avoiding the situation where the energy storage device is prone to damage.

Based on the above considerations, in order to collect the voltage signal and/or the temperature signal of the energy storage device in time when the energy storage device is in use, through deep research, the inventor has designed an energy storage connector, including: an integrated socket, the integrated socket including a socket body and a rear-mounted insert mounted at the socket body and used for plugging with an energy storage device; and a signal connector plug, the signal connector plug including a signal plug body, one end of the signal plug body being detachably mounted at the socket body and plugged with the rear-mounted insert, and the other end being used for plugging with a signal cable. Therefore, the voltage signal and/or the temperature signal of the energy storage device may be collected through the signal plug body and the rear-mounted insert by using the signal cable, so as to know the status of the energy storage device in time, thereby avoiding the situation where the energy storage device is prone to damage.

In addition, since one end of the signal plug body is detachably mounted at the socket body, when there is no need to collect the voltage signal and/or the temperature signal of the energy storage device, or when the signal plug body is damaged, the signal plug body can be detached from the socket body.

See FIGS. 1 to 8. According to some examples of the present application, the present application provides an energy storage connector 100, including: an integrated socket 110, the integrated socket 110 including a socket body 111 and a rear-mounted insert 112 mounted at the socket body 111 and used for plugging with an energy storage device; and a signal connector plug 120, the signal connector plug 120 including a signal plug body 121, one end of the signal plug body 121 being detachably mounted at the socket body 111 and plugged with the rear-mounted insert 112, and the other end being used for plugging with a signal cable.

The rear-mounted insert 112 is an insert connector with two insert ends, one of the two insert ends of the rear-mounted insert 112 is used for plugging with the energy storage device to obtain the voltage signal and/or the temperature signal of the energy storage device, and the other end is connected to the signal plug body 121 to transmit the obtained voltage signal and/or temperature signal of the energy storage device to the signal plug body 121. The signal plug body 121 is also an insert connector with two insert ends, one of the two insert ends of the signal plug body 121 is plugged with the rear-mounted insert 112 to receive the signal transmitted by the rear-mounted insert 112, and the other end is used for plugging with the signal cable to transmit the received signal transmitted by the rear-mounted insert 112 to the signal cable.

In this way, after the rear-mounted insert 112 and the energy storage device are plugged and the signal plug body 121 and the signal cable are plugged, when the energy storage device is used, that is, in the process that the energy storage device is used to supply power to other devices through the energy storage connector 100, or other devices are used to charge the energy storage device through the energy storage connector 100, the signal cable may be used to collect the voltage signal and/or the temperature signal of the energy storage device through the signal plug body 121 and the rear-mounted insert 112, so that the status of the energy storage device can be known in time, thereby avoiding the situation where the energy storage device is prone to damage.

Continue to see FIGS. 1 to 8. According to some examples of the present application, the signal connector plug 120 further includes a locking hook 122 and a plug case 123, and the locking hook 122 and the signal plug body 121 are both fixed at the plug case 123; the socket body 111 is provided with a protruding annular stopper 11, and an outer wall of the annular stopper 11 is provided with a protruding locking block 12; and one end of the signal plug body 121 is inserted into the annular stopper 11 along a first direction (i.e., direction X shown in FIG. 2), and the locking block 12 and the locking hook 122 are arranged in sequence along the first direction and abut against each other, so as to clamp one end of the signal plug body 121 in the annular stopper 11.

The annular stopper 11 is a protruding annular structure located on the socket body 111. The annular stopper 11 is provided with an annular inner wall and an annular outer wall surrounding the annular inner wall. The annular outer wall of the annular stopper 11 is provided with the protruding locking block 12.

In this way, after one end of the signal plug body 121 is inserted into the annular stopper 11 along the first direction and the locking block 12 and the locking hook 122 are arranged in sequence along the first direction and abut against each other, it can be ensured that the signal plug body 121 is stably fixed to the socket body 111.

In one example, the locking hook 122 may be retracted along a protruding direction of the locking block 12. In this way, when the signal plug body 121 and the socket body 111 need to be separated, the locking hook 122 may be retracted along the protruding direction of the locking block 12 and separated from the locking block 12, so as to take out one end of the signal plug body 121 from the annular stopper 11.

In yet another example, the signal connector plug 120 is further provided with a first locking piece 124 fixed at the plug case 123; the integrated socket 110 is further provided with a first buckle located on the annular stopper 11; and the locking piece 124 is detachably engaged with the first buckle, so that the signal plug body 121 is more stably fixed at the socket body 111.

Continue to see FIGS. 1 to 8. According to some examples of the present application, the socket body 111 is provided with a hanging slot 13; and one end of the rear-mounted insert 112 is detachably mounted in the hanging slot 13 and plugged with one end of the signal plug body 121, and the other end is used for plugging with the energy storage device.

In this way, by mounting one end of the rear-mounted insert 112 in the hanging slot 13, one end of the rear-mounted insert 112 may be prevented from colliding with other components, thereby avoiding damage to one end of the rear-mounted insert 112.

Continue to see FIGS. 1 to 8. According to some examples of the present application, the rear-mounted insert 112 is provided with a protruding hanging platform 14; an inner wall of the hanging slot 13 is provided with a first stopper; and one end of the rear-mounted insert 112 is inserted into the hanging slot 13 along a concave direction of the hanging slot 13, and the first stopper and the hanging platform 14 are arranged in sequence along the concave direction of the hanging slot 13 and abut against each other, so as to clamp one end of the rear-mounted insert 112 in the hanging slot 13, wherein the hanging platform 14 may be retracted along an opposite direction of its protruding direction to be separated from the first stopper.

The first stopper is a protruding block arranged at the hanging slot 13 and is used for abutting against the hanging platform 14 to fix the rear-mounted insert 112 in the hanging slot 13.

In this way, after one end of the rear-mounted insert 112 is inserted into the hanging slot 13 along the concave direction of the hanging slot 13 and the first stopper and the hanging platform 14 are arranged in sequence along the concave direction of the hanging slot 13 and abut against each other, it can be ensured that the rear-mounted insert 112 is stably fixed in the hanging slot 13. In addition, when the rear-mounted insert 112 and the socket body 111 need to be separated, the hanging platform 14 may be retracted along the opposite direction of its protruding direction and separated from the locking block 12, so that one end of the rear-mounted insert 112 is taken out from the hanging slot 13.

In one example, a connecting piece for connecting the hanging platform 14 with other structures of the rear-mounted insert 112 may be elastically deformed, and when the hanging platform 14 needs to be retracted along the opposite direction of its protruding direction, the connecting piece may be elastically deformed to reduce the distance between the hanging platform 14 and other structures of the rear-mounted insert 112, thereby causing the hanging platform 14 to retract along the opposite direction of its protruding direction.

Figure 9:
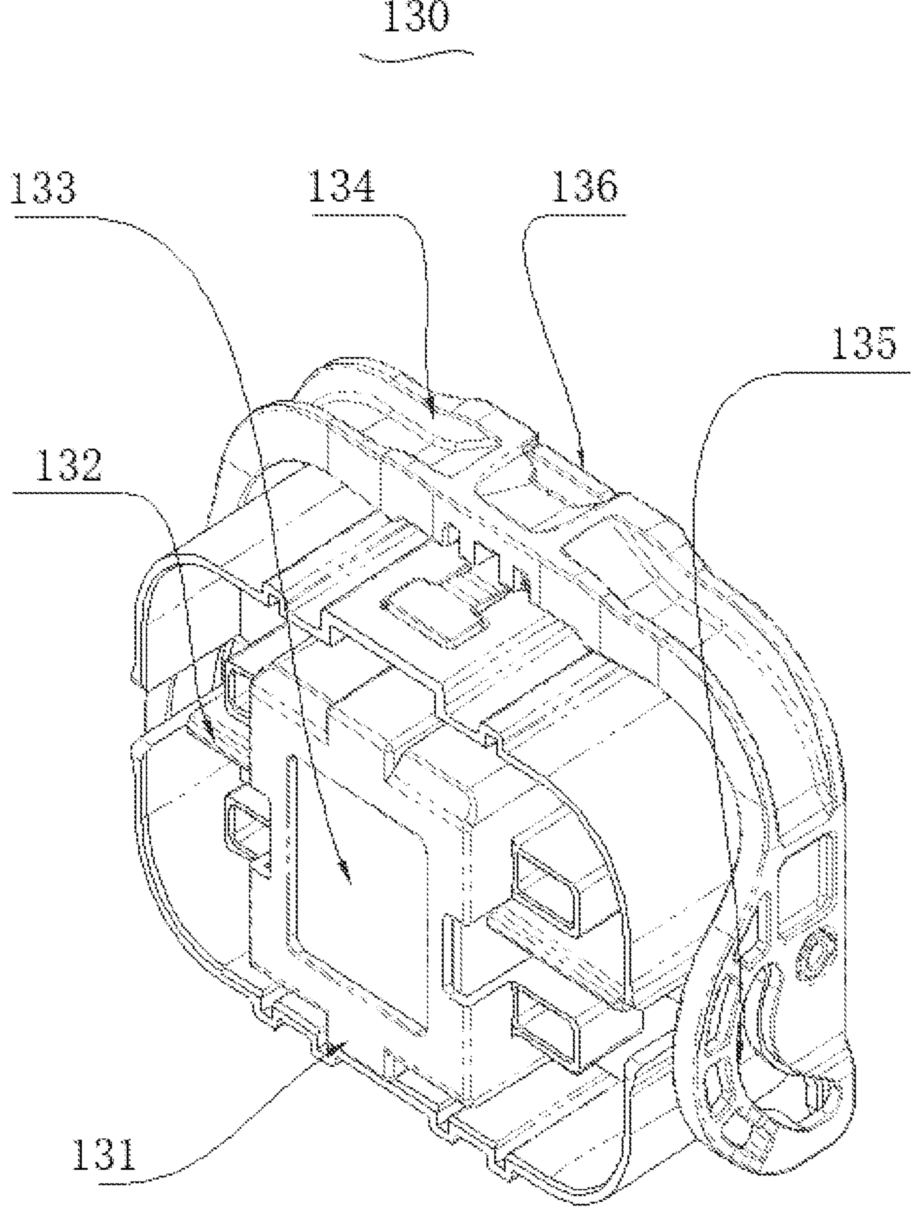
FIG. 9 is a schematic structural view of a maintenance switch according to some examples of the present application.

See FIGS. 1 to 6, and see FIG. 9 at the same time. According to some examples of the present application, the energy storage connector 100 further includes: a maintenance switch 130; the integrated socket 110 further includes two first slot assemblies mounted at the socket body 111 and used for electrical connection with a conductive loop of the energy storage device; and the maintenance switch 130 includes a switch body 131, two maintenance inserting pieces 132 and a connection structure 133 located between the two maintenance inserting pieces 132 and electrically connected to the two maintenance inserting pieces 132, the switch body 131 is detachably mounted at the socket body 111, the two maintenance inserting pieces 132 and the connection structure 133 are both fixed at the switch body 131, and the two maintenance inserting pieces 132 are inserted in the two first slot assemblies, respectively.

The first slot assemblies, the maintenance inserting pieces 132 and the connection structure 133 are all conductive connectors. After the two first slot assemblies are electrically connected to the conductive loop and the two maintenance inserting pieces 132 are inserted in the two first slot assemblies, respectively, a current flowing from a positive electrode of the energy storage device flows through one first slot assembly, one maintenance inserting piece 132, the connection structure 133, another maintenance inserting piece 132 and another first slot assembly in sequence and then flows back to a negative electrode of the energy storage device.

In this way, when the conductive loop of the energy storage device needs to be cut off, that is, electric connection between the positive electrode and the negative electrode of the energy storage device is cut off, the maintenance switch 130 may be separated from the socket body 111 to cut off the electrical connection between the two first slot assemblies, thereby cutting off the conductive loop of the energy storage device.

Continue to see FIGS. 1 to 6, and see FIG. 9 at the same time. According to some examples of the present application, the maintenance switch 130 further includes a maintenance handle 134 fixed to the switch body 131, and two first sliding rails 135 oppositely arranged at two sides of the maintenance handle 134; and the integrated socket 110 further includes two oppositely arranged first rotating shafts 15 fixed at the socket body 111, and the two first rotating shafts 15 are slidably arranged at the two first sliding rails 135 respectively.

In this way, by moving the maintenance handle 134 to make the two first rotating shafts 15 slide on the two first sliding rails 135 respectively, the maintenance inserting pieces 132 are inserted in the first slot assemblies, or the maintenance inserting pieces 132 are separated from the first slot assemblies.

In one example, the maintenance switch 130 is further provided with a second locking piece 136 fixed at the maintenance handle 134; the integrated socket 110 is further provided with a second buckle located on the socket body 111; and after the maintenance inserting pieces 132 are inserted in the first slot assemblies, the second locking piece 136 is detachably engaged with the second buckle, so that the maintenance switch 130 is more stably fixed at the socket body 111.

Continue to see FIGS. 1 to 6. According to some examples of the present application, the integrated socket 110 further includes socket buckle covers 113 fixed to the first slot assemblies, and the socket buckle covers 113 are provided with protruding buckle platforms 16; the socket body 111 is provided with buckle grooves 17, and inner walls of the buckle grooves 17 are provided with second stoppers; and at least a part of the first slot assemblies and the socket buckle covers 113 are inserted into the buckle grooves 17 along a concave direction of the buckle grooves 17, the second stoppers and the buckle platforms 16 are arranged in sequence along the concave direction of the buckle grooves 17 and abut against each other, so as to clamp at least a part of the first slot assemblies and the socket buckle covers 113 in the buckle grooves 17.

The second stoppers are protruding blocks arranged at the buckle grooves 17 and are used for abutting against the buckle platforms 16 to fix at least a part of the first slot assemblies and the socket buckle covers 113 in the buckle grooves 17.

In this way, after at least a part of the first slot assemblies and the socket buckle covers 113 are inserted into the buckle grooves 17 along the concave direction of the buckle grooves 17 and the second stoppers and the buckle platforms 16 are arranged in sequence along the concave direction of the buckle grooves 17 and abut against each other, it can be ensured that at least a part of the first slot assemblies and the socket buckle covers 113 are stably fixed in the buckle grooves 17.

Continue to see FIGS. 1 to 6. According to some examples of the present application, the first slot assemblies include slot members 114 and adapter inserting pieces 115, the slot members 114 are plugged with the maintenance inserting pieces 132, one ends of the adapter inserting pieces 115 are inserted into the slot members 114 after passing through the socket buckle covers 113, and the other ends are used for electrical connection with the conductive loop of the energy storage device; the socket buckle covers 113 are provided with position-limiting pieces 18; the slot members 114 and the socket buckle covers 113 are inserted into the buckle grooves 17 along the concave direction of the buckle grooves 17, and the position-limiting pieces 18 and the slot members 114 are arranged in sequence along the concave direction of the buckle grooves 17 and abut against each other, so as to clamp the slot members 114 in the buckle grooves 17.

In this way, after the slot members 114 and the socket buckle covers 113 are inserted into the buckle grooves 17 along the concave direction of the buckle grooves 17 and the position-limiting pieces 18 and the slot members 114 are arranged in sequence along the concave direction of the buckle grooves 17 and abut against each other, it can be ensured that the slot members 114 are stably fixed in the buckle grooves 17. In one example, the position-limiting pieces 18 are bumps on the socket buckle covers 113.

Continue to see FIGS. 1 to 6. According to some examples of the present application, the adapter inserting pieces 115 include protruding position-limiting side teeth 19; the socket buckle covers 113 are provided with protruding positioning spring teeth 20; the adapter inserting pieces 115 are inserted into the socket buckle covers 113 along a second direction (i.e., direction Y shown in FIG. 6), and the positioning spring teeth 20 and the position-limiting side teeth 19 are arranged in sequence along the second direction and abut against each other, wherein the positioning spring teeth 20 may be retracted along an opposite direction of their protruding direction and separated from the position-limiting side teeth 19.

The position-limiting side teeth 19 are tooth-like structures arranged at the adapter inserting pieces 115 and used for abutting against the positioning spring teeth 20 of the socket buckle covers 113; and the positioning spring teeth 20 are tooth-like elastic structures arranged at the socket buckle covers 113 and used for abutting against the position-limiting side teeth 19 of the socket buckle covers 113.

In this way, the adapter inserting pieces 115 are inserted into the socket buckle covers 113 along the second direction and the positioning spring teeth 20 and the position-limiting side teeth 19 are arranged in sequence along the second direction and abut against each other, so that it can be ensured that the adapter inserting pieces 115 are stably fixed at the socket buckle covers 113. In addition, when the adapter inserting pieces 115 and the socket buckle covers 113 need to be separated, the positioning spring teeth 20 may be retracted along the opposite direction of their protruding direction and separated from the position-limiting side teeth 19, thereby separating the adapter inserting pieces 115 from the socket buckle covers 113.

Continue to see FIGS. 1 to 6. According to some examples of the present application, each slot member 114 includes two oppositely arranged walls and two elastic pieces 21 located between the two walls, and the two elastic pieces 21 protrude along a direction in which the two elastic pieces approach each other; and one end of the adapter inserting piece 115 is inserted between the two elastic pieces 21 and makes any elastic piece 21 elastically deform under pressing of the wall fixed to the elastic piece 21 and the adapter inserting piece 115.

In this way, when one ends of the adapter inserting pieces 115 are inserted between the two elastic pieces 21, since any elastic piece 21 is elastically deformed under pressing of the wall fixed to the elastic piece 21 and the adapter inserting pieces 115, the two elastic pieces 21 may clamp the adapter inserting pieces 115, so as to improve the stability of the slot members 114 and the adapter inserting pieces 115 after plugging.

Figure 8:
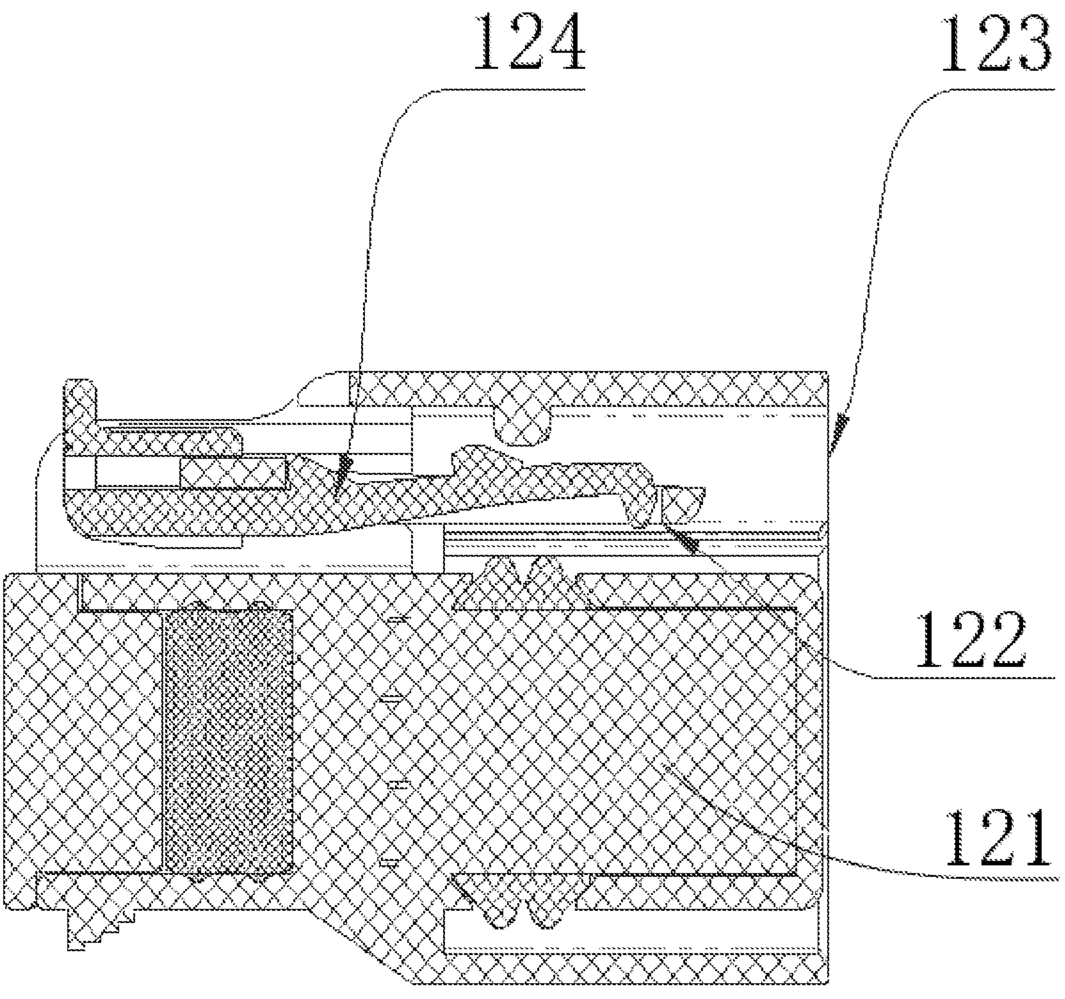
FIG. 8 is a cross-sectional view of a signal connector plug according to some examples of the present application.

See FIG. 8. According to some examples of the present application, the connection structure 133 is a fuse.

In this way, when a current flowing through the two maintenance inserting pieces 132 exceeds a specified value of the fuse, the fuse may cut off the electrical connection of the two maintenance inserting pieces 132, thereby cutting off the conductive loop of the energy storage device. Specifically, the fuse is a kind of electrical appliance that when a current flowing through the fuse exceeds a specified value, a fuse-element of the fuse fuses with heat generated by itself, thereby disconnecting a circuit. The specified value of the fuse may be 50 amperes, 100 amperes, etc., which may be set according to a current value supplied by the energy storage device connected to the energy storage connector 100.

Figure 10:
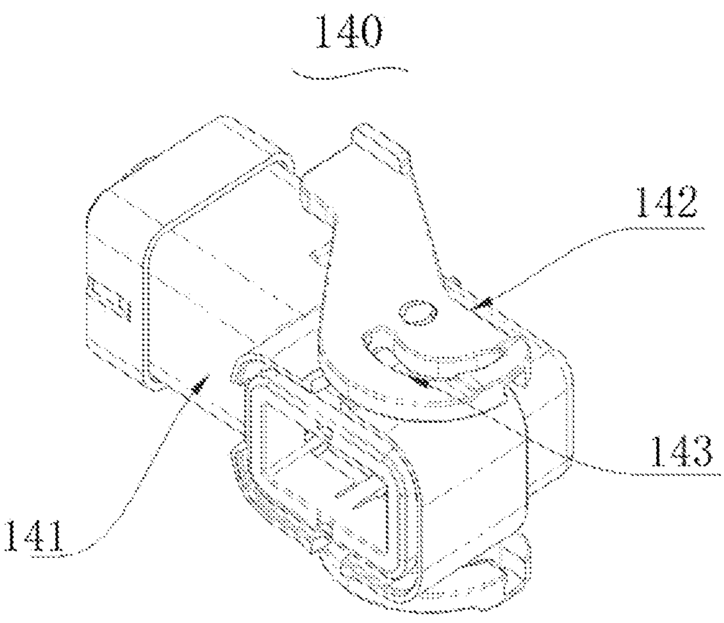
FIG. 10 is a schematic structural view of a current connector plug according to some examples of the present application.
Figure 11:
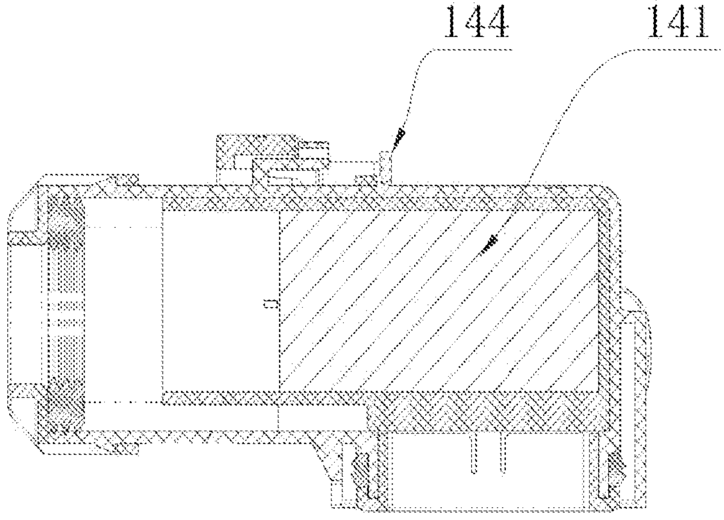
FIG. 11 is a cross-sectional view of a current connector plug according to some examples of the present application.

See FIGS. 1 to 6, and see FIGS. 10 and 11 at the same time. According to some examples of the present application, the energy storage connector 100 further includes: two current connector plugs 140; the integrated socket 110 further includes two second slot assemblies mounted at the socket body 111 and used for being plugged with positive and negative electrodes of the energy storage device, respectively; the current connector plugs 140 include current plug bodies 141; and one end of any one of the two current plug bodies 141 is detachably mounted at the socket body 111 and plugged with any one of the two second slot assemblies, and the other end is used for plugging with a cable.

Both the second slot assemblies and the current plug bodies 141 are conductive connectors. In this way, after the two second slot assemblies are plugged with the positive and negative electrodes of the energy storage device, respectively, and the two current plug bodies 141 are both plugged with the cable, the energy storage device may supply power to other devices through the energy storage connector 100 and the cable, or other devices may charge the energy storage device through the cable and the energy storage connector 100.

Continue to see FIGS. 1 to 6, and see FIGS. 10 and 11 at the same time. According to some examples of the present application, each current connector plug 140 further includes a plug handle 142 fixed to the current plug body 141, and two second sliding rails 143 oppositely arranged at two sides of the plug handle 142; and the integrated socket 110 further includes two oppositely arranged second rotating shafts 25 fixed at the socket body 111, and the two second rotating shafts are slidably arranged at the two second sliding rails 143 respectively.

In this way, by moving the plug handles 142 to make the two second rotating shafts slide on the two second sliding rails 143 respectively, the current plug bodies 141 are inserted in the second slot assemblies, or the current plug bodies 141 are separated from the second slot assemblies.

In one example, the current connector plugs 140 are further provided with third locking pieces 144 fixed at the plug handles 142; the integrated socket 110 is further provided with third buckles located on the socket body 111; and after the current plug bodies 141 are inserted in the second slot assemblies, the third locking pieces 144 are detachably engaged with the third buckles, so that the current plug bodies 141 are more stably fixed at the socket body 111.

In still other examples, the socket body 111 is further provided with buckle grooves 17 and socket buckle covers 113 matched with the second slot assemblies, and the matching manner of the buckle grooves 17 and the socket buckle covers 113 with the second slot assemblies may refer to the matching manner of the buckle grooves 17 and the socket buckle covers 113 with the first slot assemblies in the aforementioned implementation, which is not repeated here. In addition, the second slot assemblies may also be provided with slot members 114 and adapter inserting pieces 115, and the matching manner of the slot members 114 with the adapter inserting pieces 115 of the second slot assemblies may also refer to the matching manner of the slot members 114 with the adapter inserting pieces 115 of the first slot assemblies in the aforementioned examples, which is not repeated here.

See FIGS. 3 to 6. According to some examples of the present application, the integrated socket 110 further includes a flange sealing ring 116 mounted at the socket body 111 and used for abutting against the energy storage device, and the flange sealing ring 116 surrounds the rear-mounted insert 112.

In this way, after the integrated socket 110 is connected to the energy storage device, the sealing performance of a junction between the integrated socket 110 and the energy storage device can be improved. In addition, since the flange sealing ring 116 surrounds the rear-mounted insert 112, after the integrated socket 110 is connected to the energy storage device, the rear-mounted insert 112 can be prevented from being easily damaged due to the exposure of the rear-mounted insert 112.

In some examples, the flange sealing ring 116 also surrounds the first slot assemblies and the second slot assemblies. In this way, after the integrated socket 110 is connected to the energy storage device, the situation where the first slot assemblies and the second slot assemblies are prone to damage due to the exposure of the first slot assemblies and the second slot assemblies can also be avoided.

Continue to see FIGS. 3 to 6. According to some examples of the present application, the socket body 111 is provided with an annular groove 26; and a part of the flange sealing ring 116 is clamped in the annular groove 26, and the other part is used for abutting against the energy storage device.

In this way, after a part of the flange sealing ring 116 is clamped in the annular groove 26, the stability when the flange sealing ring 116 and the socket body 111 are fixed can be improved, and the relative movement of the socket body 111 and the flange sealing ring 116 can be avoided.

In some examples, the flange sealing ring 116 is an elastic sealing ring. For example, in one example, the flange sealing ring 116 is a silicone ring.

See FIGS. 3 to 6. According to some examples of the present application, the integrated socket 110 further includes a plurality of insert nuts 117 integrally formed with the socket body 111 by injection molding and used for fixing the energy storage device.

At this time, the socket body 111 is a plastic body. In this way, the integrated socket 110 can be stably fixed at the energy storage device by being fixed to the energy storage device through the plurality of insert nuts 117.

See FIGS. 1 to 11. According to some examples of the present application, the socket body 111 is provided with a first mounting surface and a second mounting surface opposite to the first mounting surface and used for being mounted to the energy storage device, and the rear-mounted insert 112 is arranged at the second mounting surface; and the signal connector plug 120 is mounted at the first mounting surface.

In this way, when the rear-mounted insert 112 and the signal connector plug 120 are assembled on the socket body 111, the signal connector plug 120 can be assembled on the first mounting surface, and the socket body 111 can be assembled on the second mounting surface, so that mutual interference of the rear-mounted insert 112 and the signal connector plug 120 in the assembling process is avoided. In some examples, the maintenance switch 130 and the current connector plug 140 are both arranged at the first mounting surface; and the first slot assemblies and the second slot assemblies are both arranged at the second mounting surface.

According to some examples of the present application, referring to FIGS. 1 to 11, the present application provides the energy storage connector 100, including: the integrated socket 110 as well as the signal connector plug 120, the maintenance switch 130 and current connector plug 140 arranged at the socket body 111 of the integrated socket 110. Therefore, after the energy storage connector 100 is connected to an energy storage battery, the signal cable and the energy storage connector 100 can be plugged to obtain the voltage signal and/or the temperature signal of the energy storage device, and after other devices are connected to the current connector plug 140 by using the cable, other devices can charge the energy storage device through the energy storage connector 100, or the energy storage device can supply power to other devices through the energy storage connector 100, and the maintenance switch 130 can be separated from the integrated socket 110 to cut off the electrical connection between the energy storage device and other devices.

Finally, it should be noted that the above examples are merely used for illustrating rather than limiting the technical solutions of the present application. Although the present application has been described in detail with reference to the above various examples, those of ordinary skill in the art should understood that the technical solutions specified in the above various examples can still be modified, or some or all of the technical features therein can be equivalently substituted; and such modifications or substitutions do not make the essence of the corresponding technical solutions depart from the scope of the technical solutions of the various examples of the present application, and shall fall within the scope of the claims of the specification of the present application. In particular, the various technical features mentioned in the various examples can be combined in any way as long as there are no structural conflicts. The present application is not limited to the specific examples disclosed herein, but rather includes all technical solutions falling within the scope of the claims.

The invention claimed is:

1. An energy storage connector, comprising:

an integrated socket, the integrated socket comprising a socket body, a rear-mounted insert mounted at the socket body and configured to be plugged with an energy storage device, and a flange sealing ring mounted at the socket body, configured to abut against the energy storage device, and surrounding the rear-mounted insert; and a signal connector plug, the signal connector plug comprising a signal plug body, one end of the signal plug body being detachably mounted at the socket body and plugged with the rear-mounted insert, and another end of the signal plug body being configured to be plugged with a signal cable.

2. The energy storage connector according to claim 1, wherein:

the signal connector plug further comprises a locking hook and a plug case, and the locking hook and the signal plug body are both fixed at the plug case;

the socket body is provided with a protruding annular stopper, and an outer wall of the annular stopper is provided with a protruding locking block; and the one end of the signal plug body is configured to be inserted into the annular stopper along a direction along which the locking block and the locking hook are arranged in sequence and abut against each other to clamp the one end of the signal plug body in the annular stopper.

3. The energy storage connector according to claim 1, wherein the socket body is provided with an annular groove, a part of the flange sealing ring is clamped in the annular groove, and another part of the flange sealing ring is used configured to abut against the energy storage device.

4. The energy storage connector according to claim 1, wherein the integrated socket further comprises a plurality of insert nuts integrally formed with the socket body by injection molding and configured to fix the energy storage device.

5. The energy storage connector according to claim 1, wherein:

the socket body is provided with:

a first mounting surface; and a second mounting surface opposite to the first mounting surface and configured to be mounted to the energy storage device;

the rear-mounted insert is arranged at the second mounting surface; and the signal connector plug is mounted at the first mounting surface.

6. The energy storage connector according to claim 1, wherein:

the socket body is provided with a hanging slot; and one end of the rear-mounted insert is detachably mounted in the hanging slot and plugged with the one end of the signal plug body, and another end of the rear-mounted insert is configured to be plugged with the energy storage device.

7. The energy storage connector according to claim 6, wherein:

the rear-mounted insert is provided with a protruding hanging platform;

an inner wall of the hanging slot is provided with a stopper;

the one end of the rear-mounted insert is configured to be inserted into the hanging slot along a concave direction of the hanging slot;

the stopper and the hanging platform are arranged in sequence along the concave direction of the hanging slot and abut against each other, so as to clamp the one end of the rear-mounted insert in the hanging slot; and the hanging platform is configured to be retracted along a direction opposite to a protruding direction of the hanging platform to be separated from the stopper.

8. The energy storage connector according to claim 1, further comprising:

a maintenance switch, comprising:

a switch body detachably mounted at the socket body; and a maintenance inserting piece fixed at the switch body;

wherein:

the integrated socket further comprises a slot assembly mounted at the socket body and configured to be electrically connected to a conductive loop of the energy storage device; and the maintenance inserting pieces is inserted in the slot assembly.

9. The energy storage connector according to claim 8, wherein:

the maintenance switch further comprises:

a maintenance handle fixed to the switch body; and two sliding rails oppositely arranged at two sides of the maintenance handle; and the integrated socket further comprises two oppositely arranged rotating shafts fixed at the socket body, the two rotating shafts being slidably arranged at the two sliding rails, respectively.

10. The energy storage connector according to claim 8, wherein:

the integrated socket further comprises a socket buckle cover fixed to the slot assembly, the socket buckle cover being provided with a protruding buckle platform;

the socket body is provided with a buckle groove, and an inner wall of the buckle groove is provided with a stopper;

at least part of the slot assembly and the socket buckle cover are configured to be inserted into the buckle groove along a concave direction of the buckle groove; and the stopper and the buckle platform are arranged in sequence along the concave direction of the buckle groove and abut against each other, so as to clamp the at least part of the slot assembly and the socket buckle cover in the buckle groove.

11. The energy storage connector according to claim 10, wherein:

the slot assembly comprises:

a slot member plugged with the maintenance inserting piece; and an adapter inserting piece, one end of the adapter inserting piece being configured to be inserted into the slot member after passing through the socket buckle cover, and another end of the adapter inserting piece being configured to be electrically connected to the conductive loop of the energy storage device;

the slot member and the socket buckle cover are configured to be inserted into the buckle groove along the concave direction of the buckle groove; and the socket buckle cover is provided with a position-limiting piece, the position-limiting piece and the slot member are arranged in sequence along the concave direction of the buckle groove and abut against each other, so as to clamp the slot member in the buckle groove.

12. The energy storage connector according to claim 11, wherein:

the adapter inserting piece comprises a protruding position-limiting side tooth;

the socket buckle cover is provided with a protruding positioning spring tooth;

the adapter inserting piece is configured to be inserted into the socket buckle cover along a direction along which the positioning spring tooth and the position-limiting side tooth are arranged in sequence and abut against each other; and the positioning spring tooth is configured to be retracted along a direction opposite to a protruding direction of the positioning spring tooth and separated from the position-limiting side tooth.

13. The energy storage connector according to claim 11, wherein:

the slot member comprises two oppositely arranged walls and two elastic pieces located between the two walls, and the two elastic pieces protrude along a direction in which the two elastic pieces approach each other; and one end of the adapter inserting piece is inserted between the two elastic pieces and configured to cause one elastic piece of the two elastic pieces to elastically deform under pressing of the adapter inserting piece and one of the two walls that is fixed to the one elastic piece.

14. The energy storage connector according to claim 8, wherein:

the maintenance inserting piece is one of two maintenance inserting pieces of the maintenance switch that are fixed at the switch body;

the maintenance switch further comprises a connection structure fixed at the switch body, located between the two maintenance inserting pieces, and electrically connected to the two maintenance inserting pieces;

the slot assembly is one of two slot assemblies of the integrated socket that are mounted at the socket body and configured to be electrically connected to the conductive loop of the energy storage device; and the two maintenance inserting pieces are inserted in the two slot assemblies, respectively.

15. The energy storage connector according to claim 14, wherein the connection structure includes a fuse.

16. The energy storage connector according to claim 1, further comprising:

a current connector plug;

wherein:

the integrated socket further comprises a lot assembly mounted at the socket body and configured to be plugged with one of a positive electrode and a negative electrode of the energy storage device;

the current connector plug comprises a current plug body, one end of the current plug body being detachably mounted at the socket body and plugged with the slot assembly, and another end of the current plug body being configured to be plugged with a cable.

17. The energy storage connector according to claim 16, wherein:

the current connector plug further comprises:

a plug handle fixed to the current plug body; and two sliding rails oppositely arranged at two sides of the plug handle; and the integrated socket further comprises two oppositely arranged rotating shafts fixed at the socket body, the two rotating shafts being slidably arranged at the two sliding rails, respectively.

18. An energy storage connector, comprising:

an integrated socket, the integrated socket comprising a socket body and a rear-mounted insert mounted at the socket body and configured to be plugged with an energy storage device;

a signal connector plug, the signal connector plug comprising a signal plug body, one end of the signal plug body being detachably mounted at the socket body and plugged with the rear-mounted insert, and another end of the signal plug body being configured to be plugged with a signal cable; and a maintenance switch, comprising:

a switch body detachably mounted at the socket body; and a maintenance inserting piece fixed at the switch body;

wherein:

the integrated socket further comprises a slot assembly mounted at the socket body and configured to be electrically connected to a conductive loop of the energy storage device; and the maintenance inserting pieces is inserted in the slot assembly.

19. An energy storage connector, comprising:

an integrated socket, the integrated socket comprising a socket body and a rear-mounted insert mounted at the socket body and configured to be plugged with an energy storage device;

a signal connector plug, the signal connector plug comprising a signal plug body, one end of the signal plug body being detachably mounted at the socket body and plugged with the rear-mounted insert, and another end of the signal plug body being configured to be plugged with a signal cable; and a current connector plug;

wherein:

the integrated socket further comprises a lot assembly mounted at the socket body and configured to be plugged with one of a positive electrode and a negative electrode of the energy storage device;

the current connector plug comprises a current plug body, one end of the current plug body being detachably mounted at the socket body and plugged with the slot assembly, and another end of the current plug body being configured to be plugged with a cable.

* * * * *